United States Patent
Ravi et al.

(10) Patent No.: US 11,015,438 B2
(45) Date of Patent: May 25, 2021

(54) ZONAL REPRESENTATION FOR FLOW VISUALIZATION

(71) Applicant: Halliburton Energy Services, Inc., Houston, TX (US)

(72) Inventors: Krishna M. Ravi, Houston, TX (US); Mark W. Roberson, Houston, TX (US); Scott Goodwin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 561 days.

(21) Appl. No.: 15/749,596

(22) PCT Filed: Sep. 18, 2015

(86) PCT No.: PCT/US2015/050988
§ 371 (c)(1),
(2) Date: Feb. 1, 2018

(87) PCT Pub. No.: WO2017/048284
PCT Pub. Date: Mar. 23, 2017

(65) Prior Publication Data
US 2018/0223650 A1 Aug. 9, 2018

(51) Int. Cl.
*E21B 47/113* (2012.01)
*G01V 15/00* (2006.01)
(Continued)

(52) U.S. Cl.
CPC .......... *E21B 47/113* (2020.05); *E21B 47/005* (2020.05); *E21B 47/10* (2013.01);
(Continued)

(58) Field of Classification Search
CPC ........ E21B 33/13; E21B 47/005; E21B 47/10; E21B 47/113; E21B 47/13; G01V 15/00; G01V 3/34
See application file for complete search history.

(56) References Cited

U.S. PATENT DOCUMENTS 6,443,228 B1 * 9/2002 Aronstam ............... E21B 47/01
166/250.11
2002/0179301 A1 * 12/2002 Schultz ................... E21B 47/01
166/250.01

(Continued)

OTHER PUBLICATIONS

International Search Report and the Written Opinion of the International Search Authority, or the Declaration, dated Feb. 15, 2016, PCT/US2015/050988, 16 pages, ISA/KR.

*Primary Examiner* — Christopher J Sebesta
(74) *Attorney, Agent, or Firm* — Haynes and Boone, LLP (57) ABSTRACT

Methods and systems are presented in this disclosure for determining information (e.g., visual information) about locations of different fluids flowing along a casing in a wellbore. A plurality of radio frequency (RF) micro-electro-mechanical system (MEMS) tags is placed in a plurality of fluids flowing through an annulus region between a casing string in the wellbore and a reservoir formation. At a plurality of sensing nodes located along the casing string, information about the fluids is gathered by communicating with the RF MEMS tags placed in the fluids. The information about fluid locations along the casing gathered by the sensing nodes is communicated to a receiving device, and appropriate operation in relation to the wellbore is performed based on the communicated information.

18 Claims, 7 Drawing Sheets

(51) Int. Cl.
*E21B 47/10* (2012.01)
*E21B 47/13* (2012.01)
*E21B 47/005* (2012.01)
*G01V 3/34* (2006.01)

(52) U.S. Cl.
CPC ............. *E21B 47/13* (2020.05); *G01V 3/34* (2013.01); *G01V 15/00* (2013.01)

(56) References Cited

U.S. PATENT DOCUMENTS

| | | |
|---|---|---|
| 2006/0271299 A1 | 11/2006 | Ward et al. |
| 2009/0033516 A1 | 2/2009 | Alteirac et al. |
| 2010/0139386 A1* | 6/2010 | Taylor ................ E21B 47/003 73/152.23 |
| 2011/0192592 A1* | 8/2011 | Roddy .................. E21B 33/13 166/250.01 |
| 2012/0132418 A1 | 5/2012 | McClung, III |
| 2014/0075297 A1* | 3/2014 | Gunturu ................ G06T 19/00 715/251 |
| 2014/0111349 A1* | 4/2014 | Roberson ......... G06K 19/07749 340/854.8 |

* cited by examiner

ZONAL REPRESENTATION FOR FLOW VISUALIZATION

PRIORITY

The present application is a U.S. National Stage patent application of International Patent Application No. PCT/US2015/050988, filed on Sep. 18, 2015, the benefit of which is claimed and the disclosure of which is incorporated herein by reference in its entirety.

TECHNICAL FIELD

The present disclosure generally relates to downhole completions and, more particularly, to methods and devices for determining and visualizing fluids in a wellbore.

BACKGROUND

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through an annulus, which is located between the exterior of the pipe and the walls of the wellbore. Next, cementing is typically performed whereby a cement slurry is placed in the annulus and permitted to set into a hard mass (i.e., sheath) to seal the annulus.

To obtain information about quality of the cementing job, it may be desirable to determine where a particular fluid is located along the casing in the annulus region of the wellbore. It may be challenging, however, to obtain information about exact locations of different fluids along the casing in the wellbore at any time instant during or after the cementing operation.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Embodiments of the present disclosure relate to methods and apparatus for obtaining information (e.g., visual information) about locations of different fluids along a casing in a wellbore, in an annulus region between the casing and a reservoir formation. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It would also be apparent to one skilled in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those skilled in the art that the apparatus according to the present disclosure is equally well suited for use in onshore operations and vice-versa. Further, unless otherwise noted, even though a Figure may depict a cased hole, it should be understood by those skilled in the art that the apparatus according to the present disclosure is equally well suited for use in open hole operations.

Illustrative embodiments and related methods of the present disclosure are described below in reference to FIGS. 1-8 as they might be employed for determining information (e.g., visual information) about locations of different fluids along a casing in a wellbore. Such embodiments and related methods may be practiced, for example, using a computer system as described herein. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
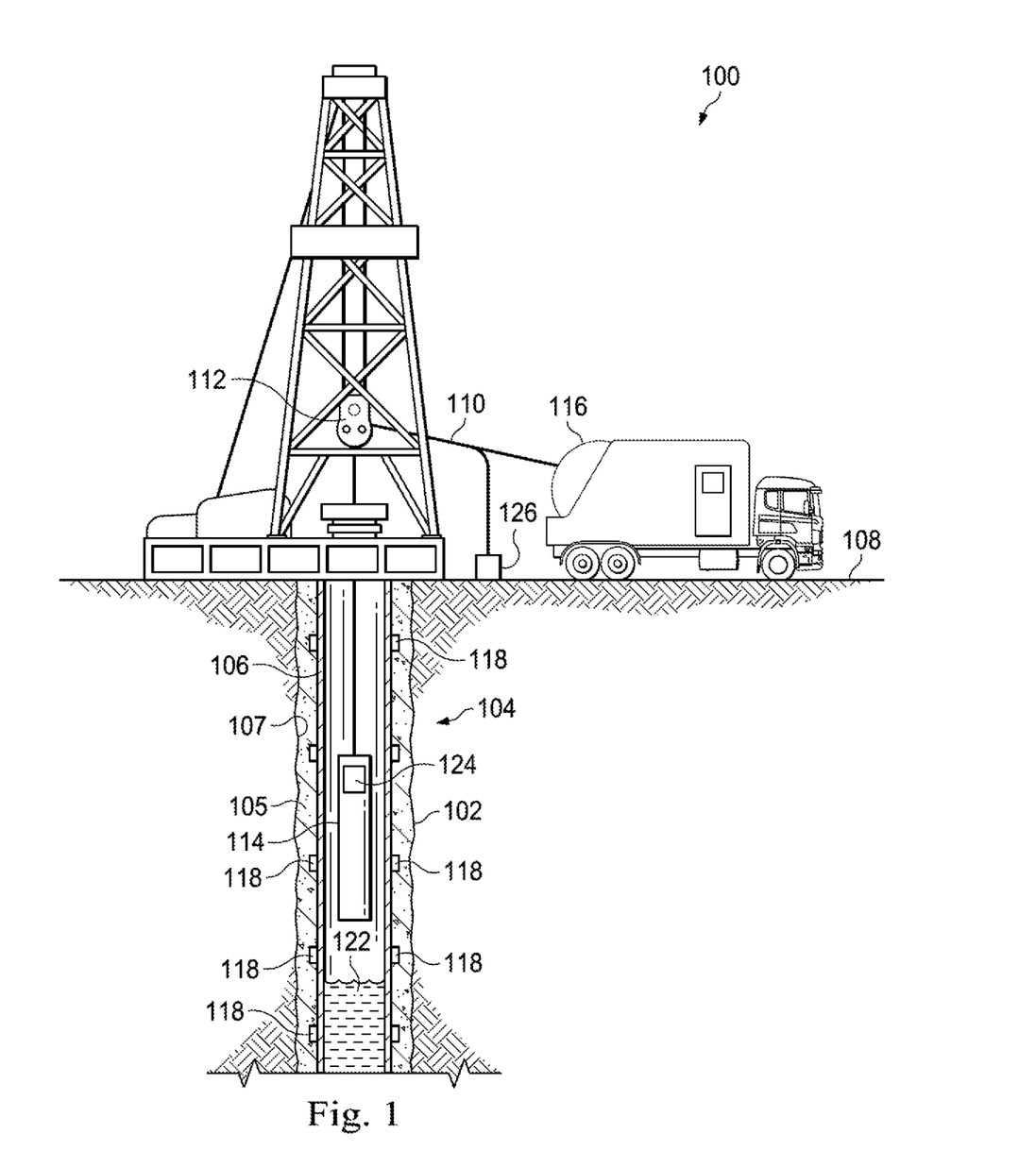
FIG. 1 is a cross-sectional view of an example of a well system that includes a system for determining characteristics of a fluid in a wellbore and/or in an annulus between a casing and a reservoir formation, according to certain embodiments of the present disclosure.

FIG. 1 is a cross-sectional view of an example of a well system 100 that includes a system for determining characteristics of a fluid in a wellbore and/or in an annulus between a casing and a reservoir formation, according to certain embodiments of the present disclosure. The well system 100 includes a wellbore 102 extending through various earth strata. The wellbore 102 extends through a hydrocarbon bearing subterranean formation 104. A casing string 106 extends from the surface 108 to the subterranean formation 104. The casing string 106 can provide a conduit through which fluid 122, such as production fluids produced from the subterranean formation 104, can travel from the wellbore 102 to the surface 108. The casing string 106 can be coupled to the walls of the wellbore 102. For example, one or more fluids 105 (e.g., cementing fluids) can be pumped (e.g., using pumping equipment or a pump) in an annulus 107 between the casing string 106 and the walls of the wellbore 102 for coupling the casing string 106 to the wellbore 102. In one or more embodiments, fluid 105 pumped into the annulus 107 may be a cement slurry. Mixing equipment (not shown) may be utilized for mixing fluids and forming the cement slurry 105.

The well system 100 can also include at least one well tool 114 (e.g., a formation-testing tool). The well tool 114 can be coupled to a wireline 110, slickline, or coiled tube that can be deployed into the wellbore 102. The wireline 110, slickline, or coiled tube can be guided into the wellbore 102 using, for example, a guide 112 or winch. In some examples, the wireline 110, slickline, or coiled tube can be wound around a reel 116.

For certain embodiments, drilling mud and/or spacer fluids may be initially located in the annulus 107. As the cement (or cement slurry) is pumped through the casing and into the annulus 107 (e.g., using pumping equipment or pump), the cement displaces the spacer fluid, which in turn, displaces the drilling mud. The contamination of cement with drilling mud or spacer can have negative consequences for curing and integrity of the cement, and can provide potential conduits for flow behind the casing string 106. Hence, monitoring flow of fluids 105 in the annulus 107 along the casing string 106 is of great importance.

The well system 100 can include one or more nodes (sensors) 118 that may be located at discrete locations along the casing string 106 (e.g., external to the casing string 106) in the annulus region 107, configured for monitoring flow of fluids 105 and/or 122. In one or more embodiments, the sensors 118 can include a protective housing (e.g., a fluid resistant housing). This can prevent the sensors 118 from being damaged by fluids 105, 122, the well tool 114, and/or debris downhole.

For certain embodiments, a sensor 118 can include an inclinometer. The inclinometer can determine the inclination of the well system 100 (e.g., by detecting the inclination of the casing string 106 to which the sensor 118 can be coupled). This can be particularly useful if the well system 100 is an angled well system (e.g., the wellbore 102 is drilled at an angle between 0 and 90 degrees). Additionally or alternatively, a sensor 118 can include a pH sensor. The pH sensor can determine the pH of one or more fluids 105, 122 in the wellbore 102. In some examples, the sensor 118 can additionally or alternatively include a hydrocarbon sensor. The hydrocarbon sensor can detect the presence of, or a characteristic of, a hydrocarbon in the wellbore 102.

For certain embodiments, the sensors 118 can be coupled external to the casing string 106 in the annulus 107. This can allow the sensors 118 to monitor the characteristics of the well system 100, even if the well tool 114 is removed or changed. For example, the sensors 118 can be positioned external to an outer housing of, or partially embedded within, the casing string 106. In one or more embodiments, as discussed in more detail below, the sensors 118 may be configured to directly communicate with Radio Frequency (RF) Micro-Electro-Mechanical System (MEMS) tags placed in fluids flowing through the annulus 107 along the casing string 106 during the cementing operation. This can allow the sensors 118 to obtain information where a specific fluid is positioned in the annulus 107 at any time (e.g., during and/or after cementing job), which is of crucial importance for evaluating quality of the cementing job in the wellbore.

In one or more embodiments, the sensors 118 can transmit data (e.g., via wires or wirelessly) with information about characteristics of the wellbore 102, the fluids 105, and/or the fluid 122 to a receiver 124 of the well tool 114. In one or more other embodiments, the sensors 118 can transmit data (e.g., via wires or wirelessly) with information about the characteristics of the wellbore 102, the fluids 105, and/or the fluid 122 to a receiver 126 positioned on a surface 108. In one or more other embodiments, the sensors 118 can transmit data (e.g., wirelessly) with information about the characteristics of the wellbore 102, the fluids 105, and/or the fluid 122 to one or more other sensors 118. The information may be then relayed from the receiving sensors 118 to the receiver 124 and/or the receiver 126.

Figure 2:
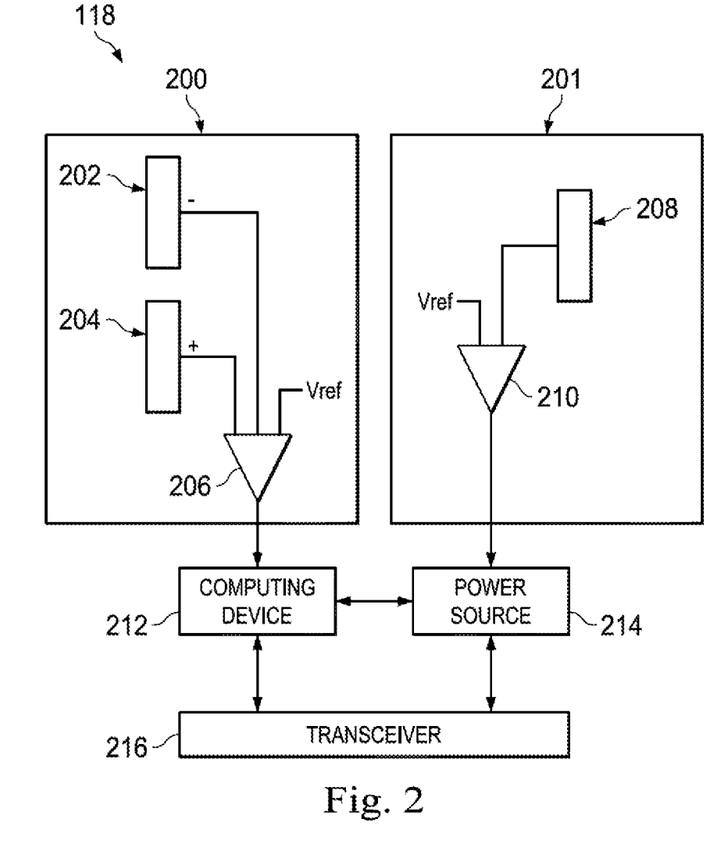
FIG. 2 is a block diagram of an example of a sensor for determining characteristics of a fluid in a wellbore, according to certain embodiments of the present disclosure.

The sensors 118 can transmit and receive data using a transceiver, as described in greater detail with respect to FIG. 2. In some embodiments, the sensors 118 can transmit data using very low frequency (VLF) magnetic or current pulses, ultrasonic pulses, acoustic pulses, electromagnetic coupling, inductive coupling, or any combination of these.

One or more receivers 124, 126 can be positioned in the well system 100 for receiving data from the sensors 118. In some embodiments, the receivers 124, 126 can be positioned on the well tool 114, on the casing string 106, or at the surface 108 of the well system 100. The receivers 124, 126 can directly or indirectly receive the data from the sensors 118 (or other receivers) via a transceiver (which can be substantially the same as transceiver 216 of FIG. 2). For example, a receiver 124 can wirelessly receive data from a sensor 118. The receiver 124 can then relay the data via wireline 110 to another receiver 126 at the surface 108. In some embodiments, the receiver 124 can include a distributed acoustic sensor (DAS). A DAS can include a fiber-optic device configured to detect acoustic transmissions (e.g., acoustic emissions) from the sensors 118. In some embodiments, the receiver 124 can use the DAS to receive (e.g., detect) acoustic transmissions from the sensor 118.

FIG. 2 is a block diagram of an example of a sensor 118 placed along the casing string 106 in the annulus 107 of the wellbore 102 illustrated in FIG. 1. In some embodiments, components shown in FIG. 2 (e.g., computing device 212, power source 214, transceiver 216, pH sensor 200, and pH sensor 201) can be integrated into a single structure. For example, the components illustrated in FIG. 2 can be within a single housing. In other embodiments, the components shown in FIG. 2 can be distributed (e.g., in separate housings) and in electrical communication with each other.

In one or more embodiments, the sensor 118 may include a pH sensor 200. The pH sensor 200 may include two electrodes 202, 204. The electrodes 202, 204 may include different conductive materials (e.g., different types of metal). For example, one electrode 202 may include copper and the other electrode 204 may include gold. The electrodes 202, 204 may be exposed for contacting fluid (e.g., cement) in a wellbore. Upon a fluid contacting the electrodes 202, 204, a voltage may be generated between the electrodes 202, 204. The amount of voltage generated between the electrodes 202, 204 may depend on the pH of the fluid. A comparator 206 may compare the voltage generated between the electrodes 202, 204 to a reference voltage (e.g., Vref) to determine whether the voltage generated between the electrodes 202, 204 is larger or smaller than the reference voltage. In some examples, the reference voltage may be calibrated such that the voltage generated between the electrodes 202, 204 is larger than the reference voltage when the fluid contains a particular pH level or is above a threshold pH level. In some examples, the comparator 206 may transmit a signal associated with the comparison of the voltages to a computing device 212. The computing device 212 may receive the signal and determine the pH of the fluid based on the signal.

The sensor 118 may additionally or alternatively include another pH sensor 201. The other pH sensor may include an ionic sensor 208. An ionic sensor 208 may convert the activity of a specific ion dissolved in a fluid into electrical potential (e.g., voltage). Upon a fluid contacting the ionic sensor 208, a voltage may be generated that can be transmitted to a comparator 210. The comparator 210 may compare the voltage generated by the ionic sensor 208 to a reference voltage. In some examples, the reference voltage may be calibrated such that the voltage generated by the ionic sensor 208 is larger than the reference voltage when the fluid contains a particular pH level or is above a threshold pH level. In some examples, the comparator 210 may transmit a signal associated with the comparison of the voltages to a computing device 212. The computing device 212 can receive the signal and determine the pH of the fluid based on the signal.

For certain embodiments, as discussed in greater detail below, the transceiver 216 of the sensor 118 may communicate with an RF MEMS tag (e.g., with the RF MEMS tag closest to that sensor 118), which may be located in the fluid 105 flowing along the casing string 106 in the annulus region 107 of the wellbore 102 during the cementing operation. The RF MEMS tag may generate a signal indicative of that fluid 105, and provide the signal to the transceiver 216. The signal received by the transceiver 216 may be then relayed to one or more other transceivers 216 of one or more sensors 118. Additionally or alternatively, signal received by the transceiver 216 may be may be directly transmitted from the sensor 118 to the receiver 124 and/or the receiver 126 for further processing and usage by a well operator.

In some embodiments, the computing device 212 can record (e.g., in memory) information about the fluid 105 obtained from the RF MEMS tag located in that fluid 105. Additionally or alternatively, the computing device 212 can be configured to initiate transmission (e.g., wired or wireless) of a signal with information about the fluid 105 via the transceiver 216 to the receiver 124 and/or the receiver 126.

The sensor 118 can transmit and receive data via the transceiver 216. The transceiver 216 can represent any components that facilitate a network connection. In some embodiments, the transceiver 216 can be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). Further, in some embodiments, the transceiver 216 can wirelessly transmit data using very low frequency (VLF) magnetic or current pulses, ultrasonic pulses, acoustic pulses, electromagnetic coupling, inductive coupling, or any combination of these. In other embodiments, the transceiver 216 can be wired and can include interfaces such as Ethernet, USB, IEEE 1394, or a fiber optic interface.

As discussed, some embodiments of the present disclosure are directed to RF MEMS tags placed in fluids related to cementing operation in an annulus between a casing string and a reservoir formation. In one or more embodiments, RF MEMS tags are geometrically shaped to provide protection and flow efficiency during cementing operations. In a generalized embodiment, the RF MEMS tag is comprised of a first planar structure having a first and second side. RF circuitry is positioned on the first side of the planar structure, and configured to resonate at a resonant frequency. The first planar structure and RF circuitry result in the RF MEMS tag having a first geometric shaped (e.g., rectangular). A protective structure is placed atop the circuitry which, in turn, alters the shape of the RF MEMS tag to a second geometric shape. The protective structure may be another planar structure or a thick-film material having a variety of shapes. In addition to providing protection for the RF circuitry, the protective structure also increases the flow efficiency of the RF MEMS tag as it flows in the cement slurry during pumping.

In a generalized method, one or more RF MEMS tags are mixed into a wellbore cement mixture, and the mixture is pumped downhole into the wellbore annulus. The RF MEMS tags include RF circuitry that resonates at a desired frequency. When pumping is complete (or during pumping), an interrogation tool, which may be deployed downhole or form part of the downhole completion system (e.g., the sensor or node 118 positioned externally on the casing 106 in the wellbore 102 illustrated in FIG. 1), interrogates the RF MEMS tags in the annulus using RF signals emitted at the resonant frequency. In turn, the RF MEMS tags are activated, whereby they interact with the two high resonant frequency RF signals, thereby resulting in a response signal. When the interrogation tool emits the RF signal, the RF circuitry of the RF MEMS tags will begin to resonant which, in turn, absorbs power from the emitted signal, thus resulting in a response signal having less power than the emitted signal. The interrogation tool can then detect this response signal, which also indicates the presence of the RF MEMS tag, which in turn may be used to perform a wellbore operation.

Figure 3:
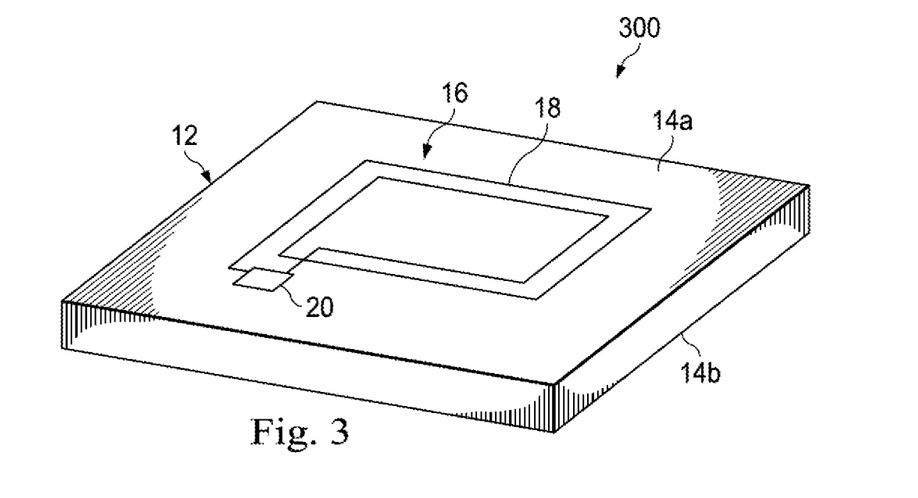
FIG. 3 is a three-dimensional view of a Radio Frequency (RF) Micro-Electro-Mechanical System (MEMS) tag, according to certain embodiments of the present disclosure.

FIG. 3 shows a three-dimensional view of a single RF MEMS tag, according to certain illustrative embodiments of the present disclosure. RF MEMS tag 300 is comprised of a planar structure 12 having a first side 14*a* and a second side 14*b*. RF MEMS tag 300 may be fabricated using any variety of dicing techniques or other semiconductor fabrication techniques. Planar structure 12 is a low loss tangent structure, such as, for example, a semiconductor substrate (e.g., Si or $SiO_2$), quartz, sapphire, polyethylene, polystyrene or Teflon. Planar structure 12 may take on a variety of dimensions, such as, for example, 500 nanometers thick and 1850 nanometers in length and width. Additionally, the shape of planar structure 12 may be varied, such as, for example, circular or rectangular.

RF MEMS tag 300 includes RF circuitry that resonates at a resonant frequency. First side 14*a* of planar structure 12 includes an inductor-capacitor circuit ("LC circuit") 16 which includes an inductor 18 connected to a capacitor 20. Inductor 18 may be comprised of a variety of low resistivity materials, such as, for example, copper. Although not shown, RF circuit 16 may include a thin-film protective layer atop it, such as, for example, Benzocylobutene or another suitable material. The thin-film layer is typically 25 microns or less, and may be formed using a photo-resistive technique, for example. Such a thin-film layer would be useful in providing dust protection, among others. Also, although described as an LC circuit, a variety of other RF circuits may also be utilized, as will be understood by those ordinarily skilled in the art having the benefit of this disclosure.

For RF MEMS tags placed in the fluids around a casing in borehole applications, the geometric shape is an important parameter. Generally, a rounded shape is desirable because such shapes flow more freely in the downhole environment. Accordingly, for certain embodiments described herein, the geometric shape of MEMS tag 300 is altered to a rounded shape, which increases the flow efficiency of the MEMS tag.

Additionally, the protective structure provides protection for the RF circuitry, while maintaining the RF performance of the circuit.

For certain embodiments of the present disclosure, during a cement pumping job, it is crucial to understand the makeup of different fluid mixtures as a function of time and casing number. Certain embodiments of the present disclosure are directed to methods for analyzing the flow characteristics at different azimuthal zones along the casing in the wellbore by characterizing population of RF MEMS tags placed in the fluids during the cement pumping job. Based on information about locations of different fluids along the casing in the wellbore at any time, quality of the cement pumping job can be evaluated and appropriate operations related to the wellbore can be initiated.

Figure 4A:
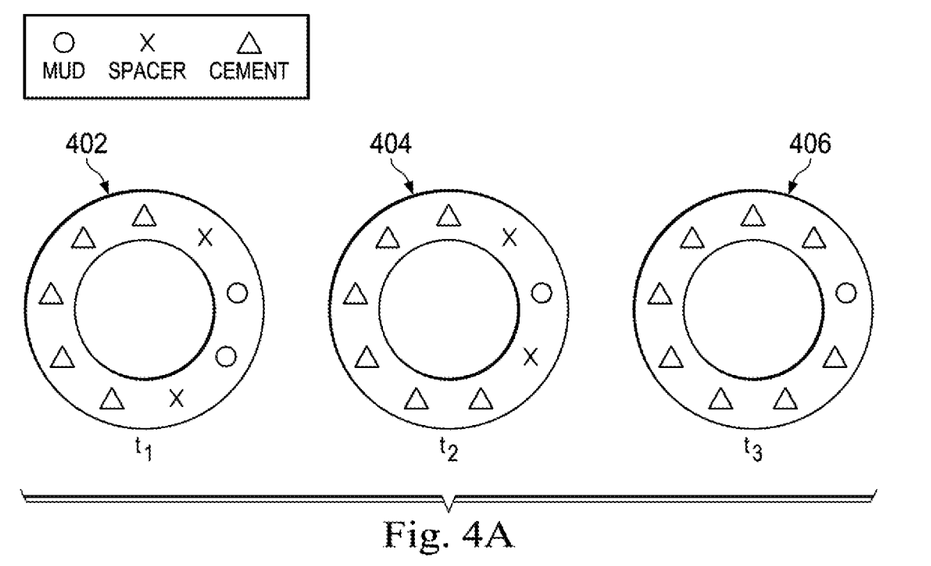
FIG. 4A is a top view of an annulus region of a wellbore between a casing string and a reservoir formation for three consecutive time instants showing information about a specific fluid at each node location along the casing string obtained from MEMS tags placed in the fluids, according to certain embodiments of the present disclosure.

FIG. 4A illustrates views 402, 404, 406 of an annulus region of a wellbore between a casing string and a reservoir formation (or walls of the wellbore) for three consecutive time instants (e.g., $t_1$, $t_2$ and $t_3$) according to certain embodiments of the present disclosure. FIG. 4 shows visual information (i.e., a visualization) about a specific fluid at each node (sensor) location along the casing string obtained from MEMS tags placed in fluid mixtures used during cementing operation. In one or more embodiments, three different RF MEMS tags may be distinguished based on a different resonant frequency, and placed in different fluids. For example, the first type of RF MEMS tags may operate at a first resonant frequency indicative of a mud flow, and may be placed in a drilling mud flowing through the annulus along the casing string in the wellbore. In one or more embodiments, during drilling operation, drilling mud may be injected to assist the drilling process. The mud may be, for example, water-based or oil-based. The second type of RF MEMS tags may operate at a second resonant frequency indicative of a spacer flow, and may be placed in a spacer flowing through the annulus along the casing string in the wellbore. In one or more embodiments, a spacer fluid may be used before pumping a cement to flush the borehole and displace the drilling mud. The third type of RF MEMS tags may operate at a third resonant frequency indicative of a cement flow, and may be placed in a cement flowing through the annulus along the casing string in the wellbore. In one or more other embodiments, RF MEMS tags may differentiate fluids based on different dielectric properties of the fluids.

At each node (sensor) location along the casing string in the annulus of the wellbore (e.g., at each node 118 of the wellbore 102 from FIG. 1), a signal indicative of a specific fluid may be detected from an RF MEMS tag placed in that fluid (e.g., the RF MEMS tag nearest to that node 118). FIG. 4A illustrates the view 402 of an annulus region between a casing string and a reservoir formation (or walls of the wellbore) for a time instant $t_1$, with nodes at discrete locations along the casing string indicative of different fluid flows (e.g., "o" indicates mud flowing, "x" indicates spacer flowing, and "Δ" indicates cement flowing). The view 404 in FIG. 4 of the annulus region between the casing string and the reservoir formation for a time instant $t_2 > t_1$ shows the same nodes as in the view 402 indicative of specific fluid flows propagating through the annulus region from time instant $t_1$ to time instant $t_2$, providing details as to the flow dynamics. The view 406 of the annulus region between the casing string and the reservoir formation for a time instant $t_3 > t_2$ shows the cement is located in all but one discrete location along the casing, wherein a mud is located at one discrete location along the casing.

Figure 4B:
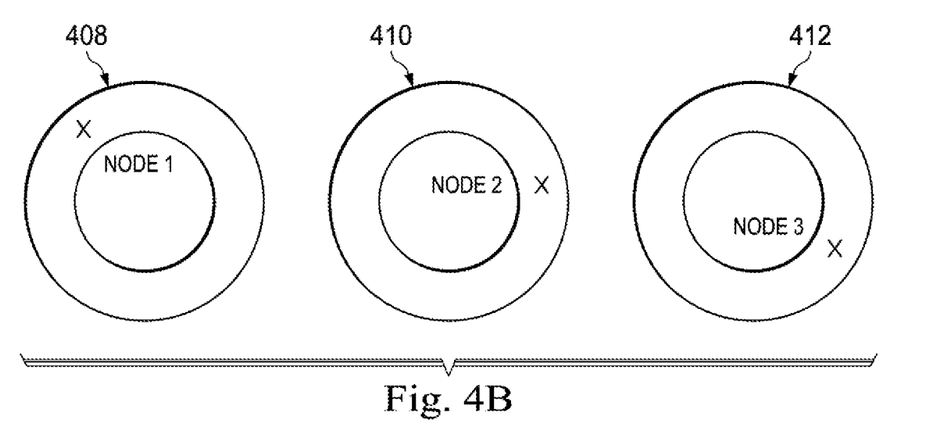
FIG. 4B is a top view of an annulus region of a wellbore between a casing string and a reservoir formation showing information about a specific fluid at three different node locations along the casing string obtained from a single MEMS tag placed in that fluid, according to certain embodiments of the present disclosure.

FIG. 4B illustrates views 408, 410, 412 of an annulus region of a wellbore between a casing string and a reservoir formation (or walls of the wellbore) with information about a specific fluid 'X' (e.g., spacer) at three different node locations along the casing string obtained from a single RF MEMS tag placed in that particular fluid, according to certain embodiments of the present disclosure. In the illustrative views 408, 410, 412 of the annulus region of the wellbore, propagation of the spacer along the casing string is detected and visualized at three different nodes for three consecutive time instants based on information from a single RF MEMS tag with a unique identifier placed in the spacer. Thus, by identifying the RF MEMS tag in different zonal locations on different casing sites, it can be possible to infer the pumping fluid flow. For example, as seen in FIG. 4B, fluid 'X' (e.g., spacer) is flowing in a spiral pattern along the casing through nodes 1-3.

Figure 5A:
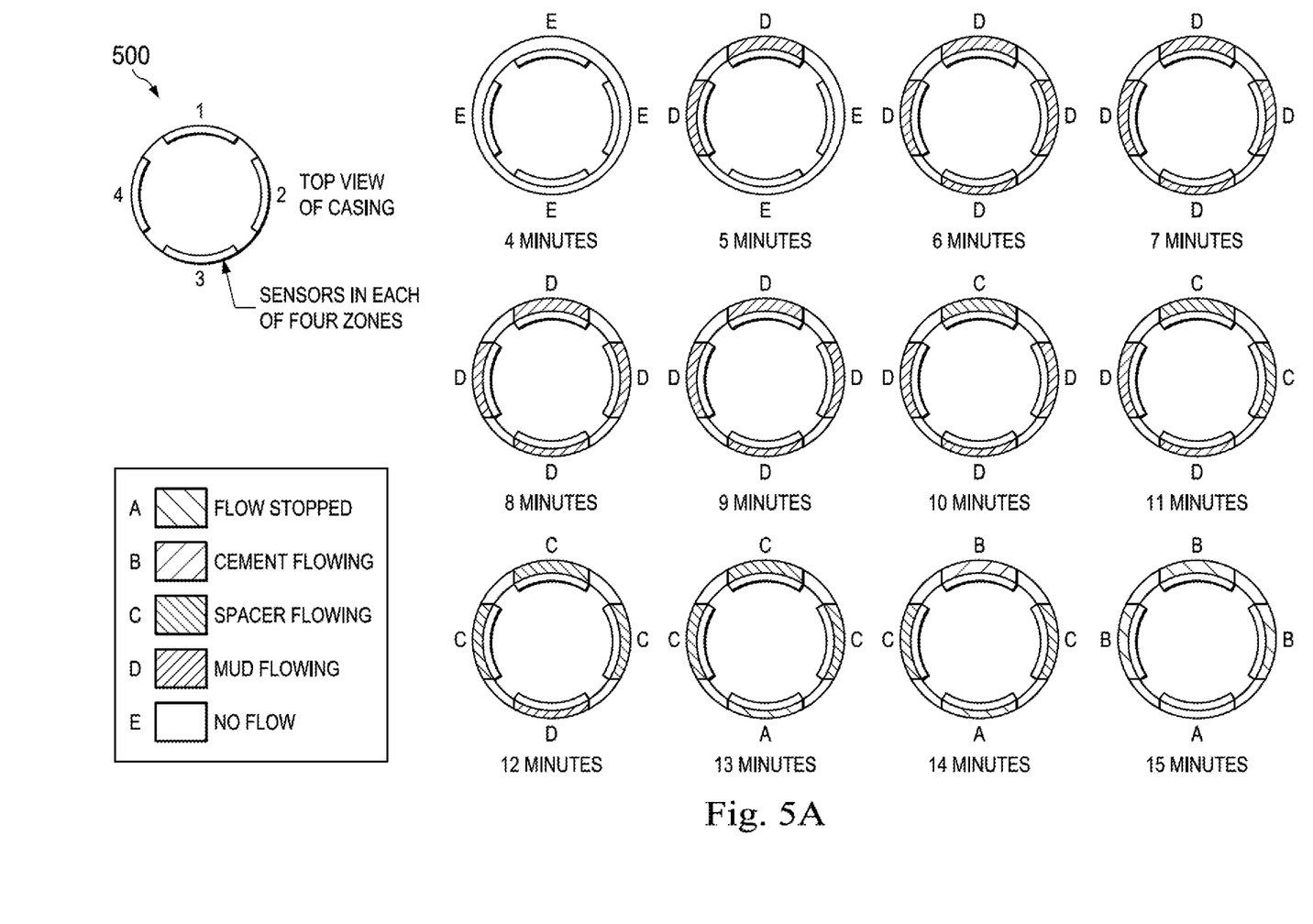
FIG. 5A is a top view of a casing in a wellbore with sensors located in different azimuthal zones of a node location along the casing showing propagation of fluids over time at the node location, according to certain embodiments of the present disclosure.

FIG. 5A is a top view of a casing site 500 of a wellbore with sensors located in different azimuthal zones (e.g., quadrants) of a node located along the casing, according to certain embodiments of the present disclosure. FIG. 5A shows propagation of fluids over time (e.g., during cementing operation) in different monitoring azimuthal zones (e.g., zones or quadrants 1, 2, 3 and 4) along the casing at the particular node location. It can be observed from FIG. 5A that mud starts to flow in all azimuthal zones (e.g., in all monitoring quadrants) after approximately 6 minutes of fluid pumping. After 13 minutes of fluid pumping, spacer is flowing through azimuthal zones 1, 2 and 4, whereas fluid flow has stopped in azimuthal zone 3. After 15 minutes of fluid pumping, cement is flowing through azimuthal zones 1, 2 and 4, whereas fluid flow has stopped in azimuthal zone 3. In one or more embodiments, as illustrated in FIG. 5A, sensors located in different azimuthal zones (e.g., quadrants) of the casing may provide (visual) information about location of each fluid of a plurality of fluids flowing along the casing string at any time instant during and/or after the cementing operation.

Figure 5B:
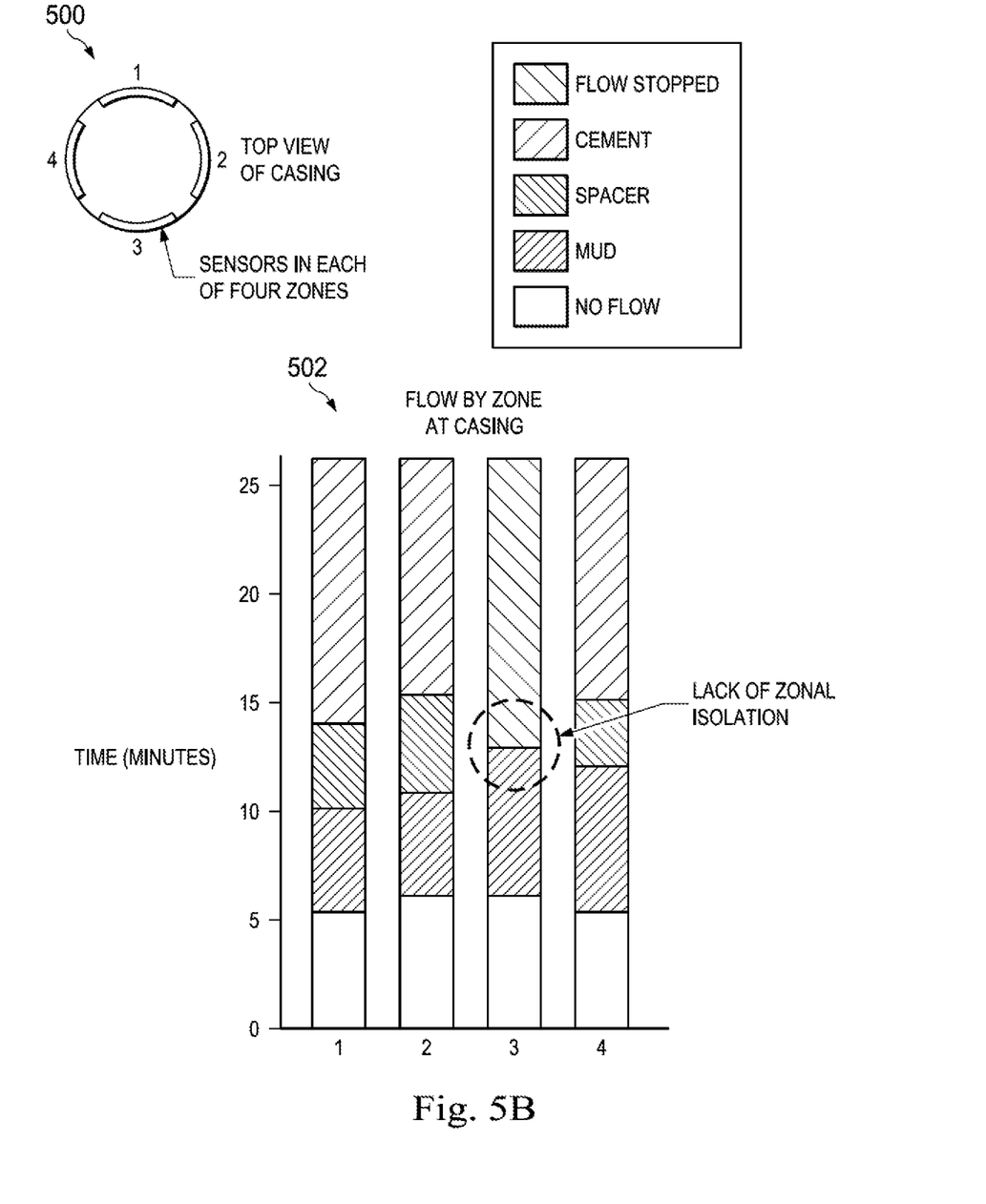
FIG. 5B is a top view of a casing in a wellbore with sensors located in different azimuthal zones of a node location showing propagation of fluids over time at the node location in a single visualization graph, according to certain embodiments of the present disclosure.

FIG. 5B is a top view of a casing cite 500 (e.g., the same casing site as in FIG. 5A) of a wellbore with sensors located in different azimuthal zones (e.g., quadrants) of a node location, according to certain embodiments of the present disclosure. FIG. 5B shows, in a single visualization graph 502, propagation of fluids over time (e.g., during cementing operation) in an annulus region of a wellbore at a specific node location along a casing string. It can be observed in the graph 502 that azimuthal zones (quadrants) 1, 2 and 4 have a proper zonal isolation and desired fluid flow during the cementing operation. In contrast, azimuthal zone (quadrant) 3 experiences flow stoppage at a certain time instant from the beginning of the fluid pumping job and lack of zonal isolation along the casing string due to residual mud because of lack of spacer flowing, as visualized by graph 502 in FIG. 5B, which may provide conduit for formation fluids to flow adjacent to the casing string causing the casing string to corrode.

Figure 6:
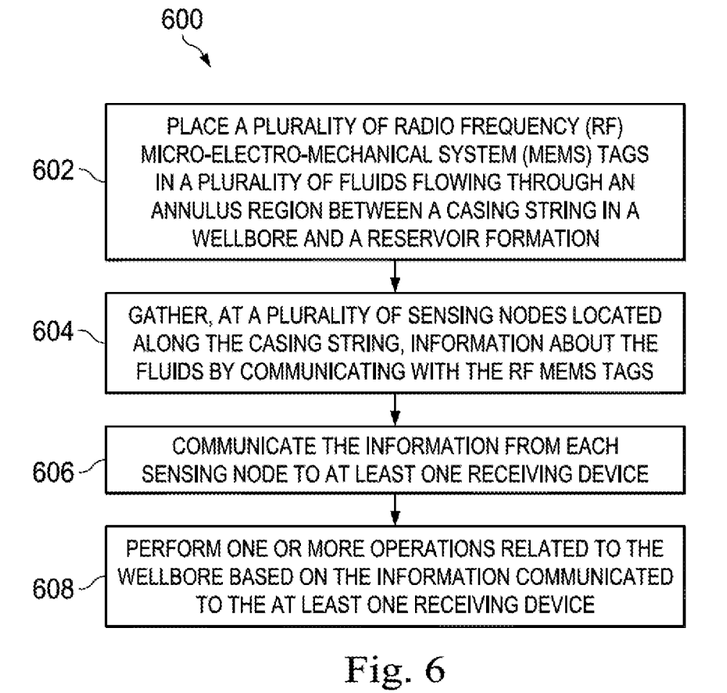
FIG. 6 is a flow chart of a method for obtaining information about locations of different fluids along a casing string in a wellbore, according to certain embodiments of the present disclosure.

Discussion of an illustrative method of the present disclosure will now be made with reference to FIG. 6, which is a flow chart 600 of a method for obtaining information about locations of different fluids along a casing in a wellbore, according to certain embodiments of the present disclosure. The method begins at 602 by placing a plurality of RF MEMS tags in a plurality of fluids flowing through an annulus region between a casing string in the wellbore and a reservoir formation. At 604, information about the fluids may be gathered at a plurality of sensing nodes located along the casing string by communicating with the RF MEMS tags placed in the fluids. At 606, the information may be communicated from each sensing node to at least one receiving device. At 608, one or more operations related to the wellbore may be performed based on the information communicated to the at least one receiving device.

Figure 7:
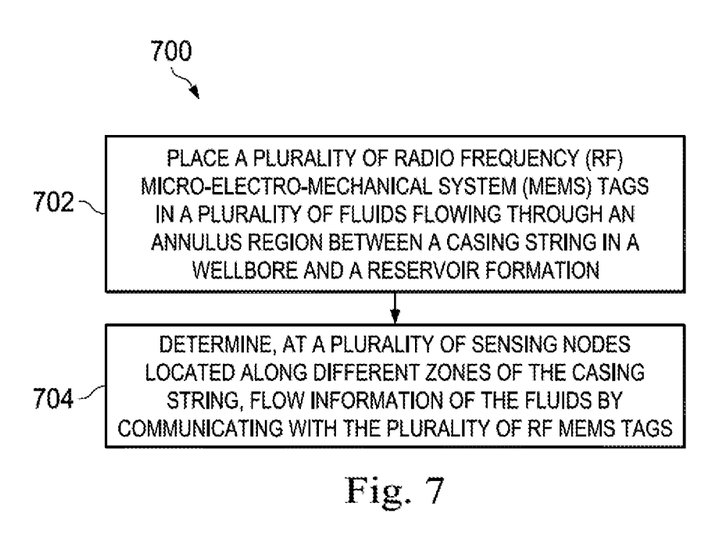
FIG. 7 is a flow chart of a method for determining fluid flow information along different zones of a casing string in a wellbore, according to certain embodiments of the present disclosure.

Discussion of an illustrative method of the present disclosure will now be made with reference to FIG. 7, which is a flow chart 700 of a method for determining fluid flow information along different zones of a casing string in a wellbore, according to certain embodiments of the present disclosure. The method begins at 702 by placing a plurality of RF MEMS tags in a plurality of fluids flowing through an annulus region between the casing string in the wellbore and a reservoir formation. At 704, flow information of the fluids may be determined at a plurality of sensing nodes located along different zones of the casing string by communicating with the plurality of RF MEMS tags placed in the fluids.

Figure 8:
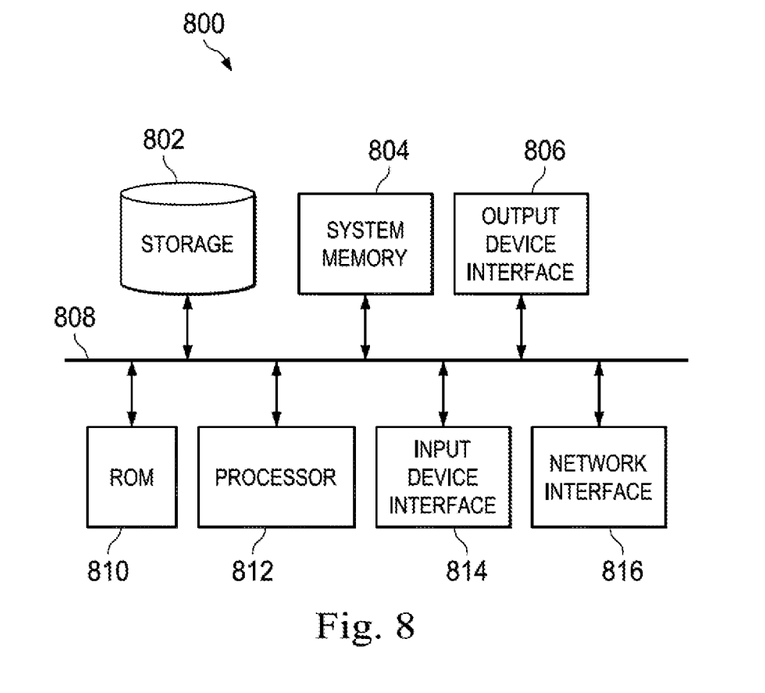
FIG. 8 is a block diagram of an illustrative computer system in which embodiments of the present disclosure may be implemented.

FIG. 8 is a block diagram of an illustrative computing system 800 in which embodiments of the present disclosure may be implemented adapted for determining and visualizing information about locations of different fluids along a casing in a wellbore during and/or after cementing operation. For example, some of the operations of methods 600 and 700 of FIGS. 6 and 7, as described above, may be implemented using the computing system 800. The computing system 800 can be a computer, phone, personal digital assistant (PDA), or any other type of electronic device. Such an electronic device includes various types of computer readable media and interfaces for various other types of computer readable media. In one or more embodiments, the computing system 800 may be, for example, an integral part of the receiver device 126 of the well system 100 illustrated in FIG. 1 located at the surface 108. The computing system 800 may be configured to receive, from any of the sensors 118, data related to characteristics of a fluid 105 located external to the casing 106 in the annulus 107 in the vicinity of that sensor 118. The computing system 800 may be further configured to process the received data related to fluid locations, provide visual information to a well operator about fluid locations along the casing, and initiate appropriate operation(s) related to the wellbore 102 (e.g., one or more corrective cementing operations) based on the information about locations of fluids along the casing.

As shown in FIG. 8, the computing system 800 includes a permanent storage device 802, a system memory 804, an output device interface 806, a system communications bus 808, a read-only memory (ROM) 810, processing unit(s) 812, an input device interface 814, and a network interface 816. The bus 808 collectively represents all system, peripheral, and chipset buses that communicatively connect the numerous internal devices of the computing system 800. For instance, the bus 808 communicatively connects the processing unit(s) 812 with the ROM 810, the system memory 804, and the permanent storage device 802.

From these various memory units, the processing unit(s) 812 retrieves instructions to execute and data to process in order to execute the processes of the subject disclosure. The processing unit(s) can be a single processor or a multi-core processor in different implementations.

The ROM 810 stores static data and instructions that are needed by the processing unit(s) 812 and other modules of the computing system 800. The permanent storage device 802, on the other hand, is a read-and-write memory device. This device is a non-volatile memory unit that stores instructions and data even when the computing system 800 is off. Some implementations of the subject disclosure use a mass-storage device (such as a magnetic or optical disk and its corresponding disk drive) as the permanent storage device 802.

Other implementations use a removable storage device (such as a floppy disk, flash drive, and its corresponding disk drive) as the permanent storage device 802 Like the permanent storage device 802, the system memory 804 is a read-and-write memory device. However, unlike the storage device 802, the system memory 804 is a volatile read-and-write memory, such a random access memory. The system memory 804 stores some of the instructions and data that the processor needs at runtime. In some implementations, the processes of the subject disclosure are stored in the system memory 804, the permanent storage device 802, and/or the ROM 810. For example, the various memory units include instructions for computer aided pipe string design based on existing string designs in accordance with some implementations. From these various memory units, the processing unit(s) 812 retrieves instructions to execute and data to process in order to execute the processes of some implementations.

The bus 808 also connects to the input and output device interfaces 814 and 806. The input device interface 814 enables the user to communicate information and select commands to the computing system 800. Input devices used with the input device interface 814 include, for example, alphanumeric, QWERTY, or T9 keyboards, microphones, and pointing devices (also called "cursor control devices"). The output device interfaces 806 enables, for example, the display of images generated by the computing system 800. Output devices used with the output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 8, the bus 808 also couples the computing system 800 to a public or private network (not shown) or combination of networks through a network interface 816. Such a network may include, for example, a local area network ("LAN"), such as an Intranet, or a wide area network ("WAN"), such as the Internet. Any or all components of the computing system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, some of the operations of methods 600 and 700 of FIGS. 6 and 7, as described above, may be implemented using the computing system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs implemented on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations in the processes disclosed is an illustration of exemplary approaches. Based upon design preferences, it is understood that the specific order or hierarchy of operations in the processes may be rearranged, or that all illustrated operations be performed. Some of the operations may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the illustrative methods described herein may be implemented by a system including processing circuitry or a computer program product including instructions which, when executed by at least one processor, causes the processor to perform any of the methods described herein.

A method for obtaining information about fluid flow in a wellbore has been described and may generally include: placing a plurality of RF MEMS tags in a plurality of fluids flowing through an annulus region between a casing string in the wellbore and a reservoir formation; gathering, at a plurality of sensing nodes located along the casing string, information about the fluids by communicating with the RF MEMS tags placed in the fluids; communicating the information from each sensing node to at least one receiving device; and performing one or more operations related to the wellbore based on the information communicated to the at least one receiving device.

For the foregoing embodiments, the method may include any one of the following operations, alone or in combination with each other: Gathering the information about the fluids at the sensing nodes comprises receiving signals from the RF MEMS tags placed in the fluids, and determining the information about the fluids based on frequencies of the signals; Positioning the at least one receiving device at a surface or in a well tool deployed into the wellbore; Positioning each of the sensors in a different azimuthal zone of the casing; Sensing, at a time instant, one or more fluids flowing by the sensors; Performing the one or more operations comprises performing cementing operation of the annulus region between the casing string and the reservoir formation based on the information from each sensing node.

A first RF MEMS tag placed in a first fluid of the plurality of fluids operate using a first resonant frequency different from a second resonant frequency of a second MEMS tag placed in a second fluid of the plurality of fluids; The plurality of fluids comprise a cement, a mud and a spacer; The sensing node comprises a set of sensors.

A method for obtaining information about fluid flow in a wellbore has been described and may generally include: placing a plurality of RF MEMS tags in a plurality of fluids flowing through an annulus region between a casing string in the wellbore and a reservoir formation; and determining, at a plurality of sensing nodes located along different zones of the casing string, flow information of the fluids by communicating with the plurality of RF MEMS tags placed in the fluids.

For the foregoing embodiments, the method may include any one of the following operations, alone or in combination with each other: Visualizing the fluid flow information at the different zones of the casing string; Visualizing the fluid flow information comprises displaying: a cross-sectional view of the casing string at one or more nodes, and identifiers indicative of the fluids flowing therethrough; Displaying each identifier comprises displaying a symbol identifying a fluid; Visualizing the fluid flow information over time based upon the identifiers; Visualizing the fluid flow information comprises displaying: a cross-sectional view of the casing string at one or more nodes, the cross-sectional view being displayed as multiple azimuthal sections, and identifiers indicative of the fluids flowing through the azimuthal sections; and Pumping the plurality of fluids through the annulus region using a pump.

The symbol comprises: a number of symbols indicating an amount of the fluid, a symbol having a size indicating an amount of the fluid, or a colored symbol identifying a type of the fluid.

Likewise, a system for obtaining information about fluid flow in a wellbore has been described and includes: a plurality of RF MEMS tags placed in a plurality of fluids flowing through an annulus region between a casing string in the wellbore and a reservoir formation; a plurality of sensing nodes located along the casing string, the sensing nodes gather information about the fluids by communicating with the RF MEMS tags placed in the fluids; at least one receiving device configured to receive the information from each sensing node; and at least one processor with a memory coupled to the at least one receiving device configured to initiate one or more operations related to the wellbore based on the information received at the at least one receiving device.

For any of the foregoing embodiments, the system may include any one of the following elements, alone or in combination with each other: the plurality of sensing nodes further configured to receive signals from the RF MEMS tags placed in the fluids, and determine the information about the fluids based on frequencies of the signals; the at least one receiving device positioned at a surface or in a well tool deployed into the wellbore; the sensing node comprises a set of sensors, each of the sensors is positioned in a different azimuthal zone of the casing, and one or more fluids flowing or no fluid flow is sensed by the sensors at a time instant; the at least one processor configured to initiate cementing operation of the annulus region between the casing string and the reservoir formation based on the information from each sensing node.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

While specific details about the above embodiments have been described, the above hardware and software descriptions are intended merely as example embodiments and are not intended to limit the structure or implementation of the disclosed embodiments. For instance, although many other internal components of computer system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

What is claimed is:

1. A method for obtaining information about fluid flow in a wellbore, the method comprising:
   placing a plurality of radio frequency (RF) micro-electro-mechanical system (MEMS) tags in a plurality of fluids flowing through an annulus region between a casing string in the wellbore and a reservoir formation, wherein a first fluid comprises a first RF MEMS tag operating at a first frequency and a second fluid comprises a second RF MEMS tag operating at a second frequency different from the first frequency;
   gathering, at a plurality of sensing nodes located along the casing string, information about the fluids by communicating with the RF MEMS tags placed in the fluids, wherein each sensing node comprises sensors at different azimuthal zones around the casing string,
   wherein the information gathered includes a population of the first and second RF MEMS tags located in each azimuthal zone around the casing string; and
   based upon a comparison of the population of the first RF MEMS tags to a population of the second RF MEMS tags, analyzing flow characteristics of the fluids in each azimuthal zone over time to thereby determine a degree of zonal isolation of the annulus region during a cementing operation.

2. The method of claim 1, wherein the plurality of fluids comprise at least one of a cement, a mud and a spacer.

3. The method of claim 1, wherein gathering the information about the fluids at the sensing nodes comprises:
   receiving signals from the RF MEMS tags placed in the fluids; and
   determining the information about the fluids based on frequencies of the signals.

4. The method of claim 1, further comprising:
   positioning the at least one receiving device at a surface or in a well tool deployed into the wellbore.

5. The method of claim 1, wherein the sensing node comprises a set of sensors, and the method further comprising:
   positioning each of the sensors in at least three different azimuthal zones of the casing; and
   sensing, at a time instant, one or more fluids flowing by the sensors.

6. A system for obtaining information about fluid flow in a wellbore, the system comprising:
   a plurality of radio frequency (RF) micro-electro-mechanical system (MEMS) tags placed in a plurality of fluids flowing through an annulus region between a casing string in the wellbore and a reservoir formation, wherein a first fluid comprises a first RF MEMS tag operating at a first frequency and a second fluid comprises a second RF MEMS tag operating at a second frequency different from the first frequency;
   a plurality of sensing nodes located along the casing string, the sensing nodes gather information about the fluids by communicating with the RF MEMS tags placed in the fluids, wherein each sensing node comprises sensors at different azimuthal zones around the casing string;
   at least one receiving device configured to receive the information from each sensing node, wherein the information gathered includes a population of the RF MEMS tags located in each azimuthal zone around the casing string; and
   at least one processor with a memory coupled to the at least one receiving device configured to analyze flow characteristics of the fluids in each azimuthal zone based upon a comparison of the population of the first RF MEMS tags to a population of the second RF MEMS tags and determine a degree of zonal isolation of the annulus region during a cementing operation.

7. The system of claim 6, wherein the plurality of fluids comprise a cement, a mud and a spacer.

8. The system of claim 6, wherein the plurality of sensing nodes is further configured to:
   receive signals from the RF MEMS tags placed in the fluids; and
   determine the information about the fluids based on frequencies of the signals.

9. The system of claim 6, wherein the at least one receiving device is positioned at a surface or in a well tool deployed into the wellbore.

10. The system of claim 6, wherein:
    the sensing node comprises a set of sensors;
    the sensors is being positioned in at least three different azimuthal zones of the casing; and
    one or more fluids flowing or no fluid flow is sensed by the sensors at a time instant.

11. A method for obtaining information about fluid flow in a wellbore, the method comprising:
    placing a plurality of radio frequency (RF) micro-electro-mechanical system (MEMS) tags in a plurality of fluids flowing through an annulus region between a casing string in the wellbore and a reservoir formation, wherein a first fluid comprises a first RF MEMS tag operating at a first frequency and a second fluid comprises a second RF MEMS tag operating at a second frequency different from the first frequency;

determining, at a plurality of sensing nodes located along different azimuthal zones around the casing string, flow information of the fluids in each azimuthal zone by communicating with the plurality of RF MEMS tags placed in the fluids and comparing a population of the first RF MEMS tags to a population of the second RF MEMS tags; and using the flow information, determining a degree of zonal isolation of the annulus region during a cementing operation.

12. The method of claim 11, further comprising visualizing the fluid flow information at the different azimuthal zones of the casing string.

13. The method of claim 12, wherein visualizing the fluid flow information comprises displaying:

a cross-sectional view of the casing string at one or more nodes; and identifiers indicative of the fluids flowing therethrough.

14. The method of claim 13, wherein displaying each identifier comprises displaying a symbol identifying a fluid.

15. The method of claim 14, wherein the symbol comprises:

a number of symbols indicating an amount of the fluid;

a symbol having a size indicating an amount of the fluid; or a colored symbol identifying a type of the fluid.

16. The method of claim 13, further comprising visualizing the fluid flow information over time based upon the identifiers.

17. The method of claim 12, wherein visualizing the fluid flow information comprises displaying:

a cross-sectional view of the casing string at one or more nodes, the cross-sectional view being displayed as multiple azimuthal sections; and identifiers indicative of the fluids flowing through the azimuthal sections.

18. The method of claim 11, further comprising pumping the plurality of fluids through the annulus region using a pump.

* * * * *